US012584566B2

(12) United States Patent
Szrom et al.

(10) Patent No.: US 12,584,566 B2
(45) Date of Patent: Mar. 24, 2026

(54) VALVE ACTUATOR

(71) Applicant: Marcin Szrom, Warsaw (PL)

(72) Inventors: Marcin Szrom, Warsaw (PL);
Krzysztof Pluta, Warsaw (PL)

(73) Assignee: Marcin Szrom, Warsaw (PL)

( * ) Notice: Subject to any disclaimer, the term of this
patent is extended or adjusted under 35
U.S.C. 154(b) by 0 days.

(21) Appl. No.: 18/633,128

(22) Filed: Apr. 11, 2024

(65) Prior Publication Data

US 2024/0263719 A1 Aug. 8, 2024

Related U.S. Application Data

(63) Continuation-in-part of application No.
PCT/IB2022/059494, filed on Oct. 5, 2022.

(30) Foreign Application Priority Data

Oct. 15, 2021 (PL) ......................................... 439232

(51) Int. Cl.
*F16K 31/524* (2006.01)
*F16K 11/22* (2006.01)
*F16K 31/04* (2006.01)

(52) U.S. Cl.
CPC ........ *F16K 31/52416* (2013.01); *F16K 11/22*
(2013.01); *F16K 31/047* (2013.01)

(58) Field of Classification Search
CPC .. F16K 31/52416; F16K 11/22; F16K 31/047;
F16K 1/24; F16K 31/528; F16K 11/0525
(Continued)

(56) References Cited

U.S. PATENT DOCUMENTS

| | | | | |
|---|---|---|---|---|
| 1,549,490 A | | 8/1925 | Josepho | |
| 2,299,615 A | * | 10/1942 | Downey | ............... F16K 11/166 |
| | | | | 403/379.5 |

(Continued)

FOREIGN PATENT DOCUMENTS

| | | | | | |
|---|---|---|---|---|---|
| CN | 109084050 A | * | 12/2018 | ....... | F16K 31/52416 |
| CN | 111841903 A | * | 10/2020 | ............. | H01R 39/64 |

(Continued)

OTHER PUBLICATIONS

International Search Report dated Jan. 2, 2023 for PCT/IB2022/059494.

(Continued)

*Primary Examiner* — Angelisa L. Hicks
(74) *Attorney, Agent, or Firm* — Ralphe E. Jocke;
WALKER & JOCKE

(57) ABSTRACT

A valve actuator (6) selectively opens and closes a plurality
of valves (8). The actuator includes a drive motor (5) that
selectively rotates a first rotor (4) about an axis (0) in first
and second rotational directions. A second rotor (2) is
rotatable about the axis only in the first rotational direction.
Actuating fingers (3) are movably mounted in operative
connection with the first rotor through drive pins (4a) and
are guided to move radially by guides (2a) positioned on the
second rotor. A coupling including drive rods (4b) which
extend from the first rotor and are movable within arcuate
slots (2b) on the second rotor, enables relative rotational
movement of the rotors and the outer ends of the actuating
fingers to be selectively radially extended and retracted. The
outer ends of the actuating fingers are engaged with one or
more valves to control the flow of working fluid.

21 Claims, 7 Drawing Sheets

(58) Field of Classification Search
USPC .......................................................... 137/883
See application file for complete search history.

(56) References Cited

U.S. PATENT DOCUMENTS

| | | | | |
|---|---|---|---|---|
| 2,420,588 A * | 5/1947 | Dunnihoo | ............. | F16K 11/166 |
| | | | | 137/607 |
| 4,861,236 A * | 8/1989 | Kustes | .................. | F04C 21/002 |
| | | | | 417/315 |
| 10,024,446 B2 * | 7/2018 | Aboujaib | ................ | F16K 11/14 |
| 2008/0105842 A1 * | 5/2008 | Webster | ................. | F16K 11/20 |
| | | | | 251/180 |
| 2021/0062687 A1 | 3/2021 | Siefker | | |

FOREIGN PATENT DOCUMENTS

| | | | | |
|---|---|---|---|---|
| DE | 102013107293 A1 * | 1/2015 | ....... | F16K 31/52416 |
| DE | 102017213663 | 1/2017 | | |
| DE | 102016004705 | 10/2017 | | |
| DE | 102017203563 | 9/2018 | | |
| JP | H01195978 | 8/1989 | | |
| WO | 20080022370 | 2/2008 | | |

OTHER PUBLICATIONS

Written Opinion of the International Searching Authority dated Jan.
2, 2023 for PCT/IB2022/059494.

* cited by examiner

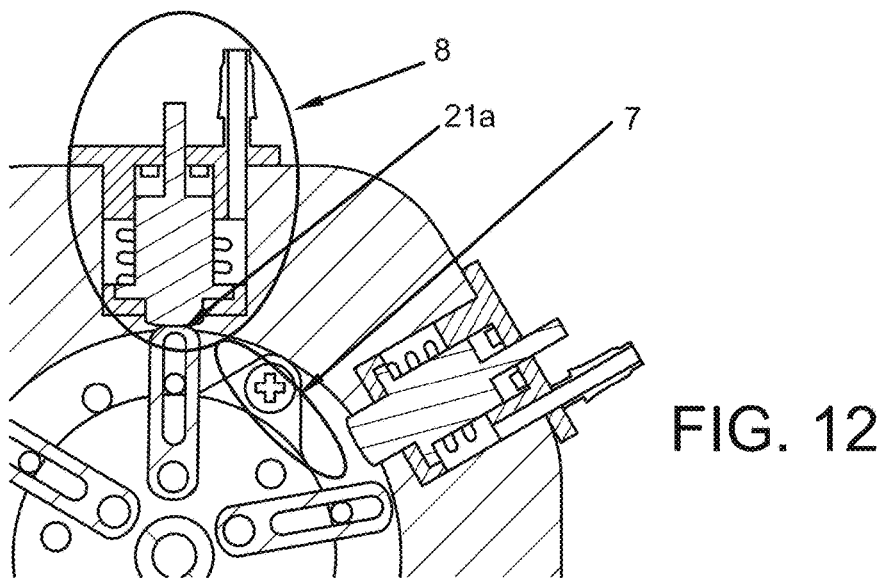
FIG. 12
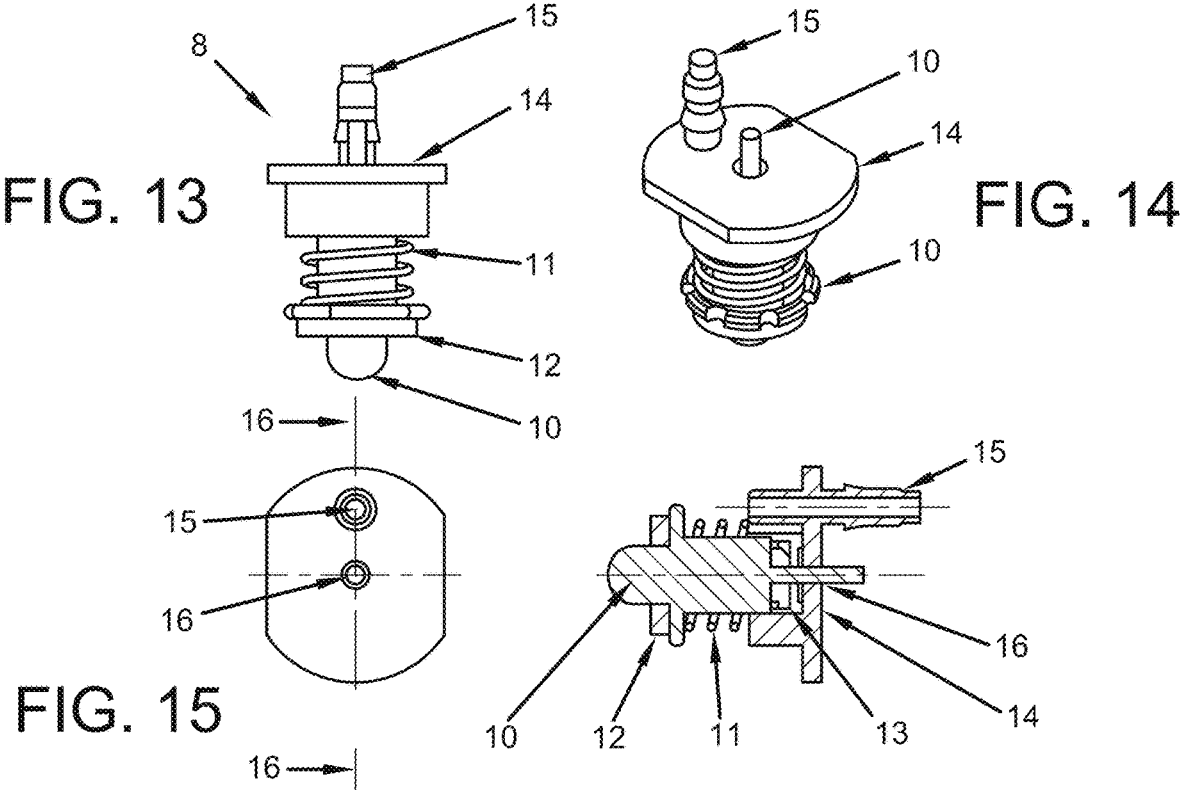
FIG. 13
FIG. 14
FIG. 15
FIG. 16

VALVE ACTUATOR

CROSS REFERENCE TO RELATED APPLICATIONS

This application is a continuation in part of International Patent Application PCT/IB2022/059494 filed Oct. 5, 2022, the disclosure of which is incorporated herein by reference in its entirety, which international application claims priority of Polish Patent Application for 3932 filed Oct. 15, 2021.

TECHNICAL FIELD

Exemplary arrangements relate to valve actuators. Exemplary arrangements relate to a valve actuator that is usable in conjunction with a rotary valve housing including a plurality of fluid valves, which enables the valves to be activated individually, selectively in groups and in selected sequences.

BACKGROUND

Many types of devices and systems include components that are activated responsive to delivery of a working fluid such as compressed air or liquid hydraulic fluid. In such systems hydraulic or pneumatic actuated devices are selectively operated by controlling the flow of working fluid to the device through one or more valves. Often such systems include numerous hydraulic and/or pneumatic components and numerous valves or other control devices must be utilized to selectively deliver the working fluid to the devices at the appropriate times as required for proper operation of the system. In such systems there is often a need to control a plurality of valves to deliver working fluid to devices individually, to multiple devices simultaneously, and to a plurality of devices in a selected sequence.

Existing arrangements of valve actuators which control the conditions of valves which operate to deliver working fluid to one or more devices in a selectively controlled manner, may benefit from improvements.

SUMMARY

Exemplary arrangements provide a valve actuator that is suitable for selectively actuating a plurality of hydraulic or pneumatic valves. The exemplary valve actuator is operative to actuate the valves selectively to enable fluid flow through each of the valves. Exemplary arrangements enable a plurality of valves to be selectively actuated individually, simultaneously and in selected sequences.

Exemplary arrangements include an actuator that includes a first rotor that is rotationally movable about an axis. The first rotor is selectively rotationally movable responsive to a motor in either a first rotational direction or a second rotational direction. The exemplary actuator further includes a second rotor. The second rotor is axially disposed from the first rotor and is also rotatably movable about the axis. The second rotor is in operative connection with a unidirectional bearing, one way clutch, ratchet or other structure that enables rotation of the second rotor in the first rotational direction, but prevents rotation of the second rotor in the second rotational direction.

The exemplary actuator further includes a plurality of actuating fingers. Each of the actuating fingers includes a longitudinal inner end and a longitudinal outer end. Each of the actuating fingers is movably mounted in operative connection with the first rotor adjacent to the inner end. The inner ends of the actuating fingers are engaged with the first rotor radially outward from the axis and in angularly spaced relation relative to the axis. The outer end of each actuating finger is configured to operatively engage and position a respective valve component of a respective fluid valve and to cause a valve element that controls fluid flow through the valve to be selectively positioned and thereby control fluid flow through the valve.

In an exemplary arrangement a plurality of guides are positioned in angularly spaced locations on the second rotor. Each of the guides is in slidable engagement with a respective actuating finger and is operative to directionally direct movement of the outer end of the actuating finger such that the outer end of the finger is movable along a radial direction.

An exemplary coupling arrangement operatively connects the first rotor and the second rotor. The exemplary coupling arrangement includes at least one drive rod that is in fixed operative connection with the first rotor. The at least one drive rod extends parallel to the axis intermediate of the first and second rotors. Each drive rod is movable relative to the second rotor within an elongated, axially centered arcuate slot on the second rotor. The arcuate slot is bounded at a first end by a first end wall and at an opposed end by a second end wall.

Rotation of the first rotor responsive to the motor in the first rotational direction causes the first rotor to rotate relative to the second rotor until the at least one drive rod is in engagement with the respective first end wall of the respective arcuate slot in which the drive rod extends. With the first rotor and the second rotor relatively rotationally positioned so that the at least one drive rod causes the second rotor to rotate in the first rotational direction in coordinated relation with the first rotor, each of the actuating fingers is caused to be positioned in a radially retracted position.

With the first and second rotors in the relative rotational positions in which the second rotor is rotated in the first rotational direction in coordinated relation with the first rotor, one or more of the outer ends of the actuating fingers may be rotated until positioned in radially aligned immediately adjacent relation with a valve stem or other member of a respective fluid valve that is in operative connection with the respective valve element of the valve.

With one or more of the outer ends of the actuating fingers in radial alignment and immediately adjacent relation with such a valve stem or other member of the valve, the motor may be operated to cause the first rotor to rotate in the second rotational direction opposed of the first rotational direction. As the first rotor rotates in the second rotational direction the second rotor is held rotationally stationary. In the exemplary arrangement the movement of the first rotor relative to the second rotor is operative to cause the outer end of each actuating finger to move radially outward from the retracted position toward an extended position. Each actuating finger outer end that is in operative connection with a valve element of a respective valve in the current rotational positions of the rotors, causes the respective valve element to be moved radially and positioned to provide fluid flow through the valve.

Fluid flow through each of the valves in operative engagement with an outer end of an actuating finger is continued until the motor is operated to cause the first rotor to again rotate in the first direction. Such movement causes relative rotational movement of the first rotor relative to the second rotor until each of the actuating fingers is again in the retracted position. As the first rotor continues to rotate in the first rotational direction, the first and second rotors then rotate in coordinated relation in the first rotational direction.

The rotors may be rotated to a further desired rotational position in which the outer ends of one or more actuating fingers is in immediately adjacent radially aligned relation with the valve stem or similar structure of one or more other fluid valves. The direction of rotation of the first rotor is then changed to the second rotational direction, which causes the outer ends of the actuating fingers to move radially outward causing fluid flow through the valves with which the outer ends of the fingers are currently radially aligned. The rotational positions of the rotors is selectively controlled to provide desired flow patterns and sequences through the fluid valves.

The exemplary valve actuator is used in some arrangements in conjunction with a plurality of valves that are angularly spaced about the axis. In some such arrangements the valves may be positioned in a plurality of angularly spaced valve chambers of a valve block housing. The actuator may be positioned in a central chamber of the valve block housing that is sealed in fluid tight relation and pressurized with working fluid through at least one inlet. In such arrangements each of the valves may have a valve inlet that is an immediate fluid connection with the central chamber, a valve outlet that is accessible external of the valve block housing, and a moveable valve element that is fluidly intermediate of the valve inlet and the valve output. In such exemplary arrangements the actuator may operate to selectively enable flow through each of the valves individually, simultaneously in groups, and in selected sequences.

Exemplary arrangements may also operate to control flow through valves arranged in different arrangements and configurations. Numerous other features of exemplary arrangements are described in the following Detailed Description and are shown in the appended drawing figures.

BRIEF DESCRIPTION OF DRAWINGS

FIG. 12 is an enlarged view of an exemplary fluid valve positioned in a valve chamber of the valve block housing.

FIG. 13 is a side view of an exemplary valve that may be positioned in a valve chamber of the exemplary valve block housing.

FIG. 14 is a top perspective view of the exemplary valve.

FIG. 15 is a top view of the exemplary valve.

FIG. 16 is a cross-sectional view of the exemplary valve taken along line 16-16 in FIG. 15.

DETAILED DESCRIPTION

Figures 1, 2:
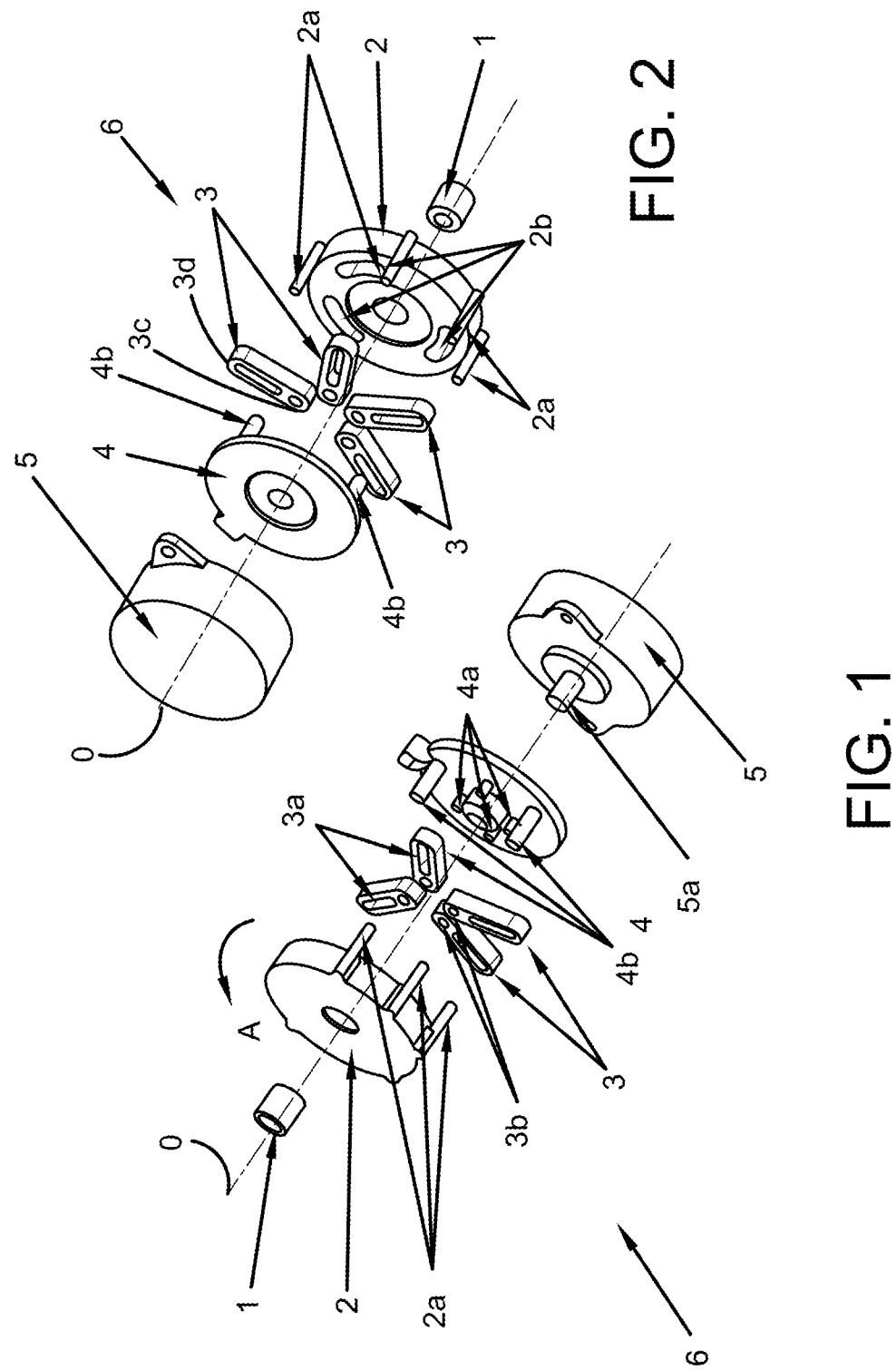
FIG. 1 is an exploded perspective view of an exemplary valve actuator.
FIG. 2 is an exploded perspective view of the exemplary valve actuator shown from the opposite end compared to FIG. 1.

Referring now to the drawings and particularly to FIGS. 1 and 2 there is shown therein an exemplary valve actuator generally indicated 6. The exemplary actuator includes a drive motor 5. The drive motor is operative to rotate a driveshaft 5a. In exemplary arrangements the drive motor comprises a motor that is operative to selectively rotate the shaft in a first rotational direction and in a second rotational direction that is opposed of the first rotational direction. Further in exemplary arrangements the drive motor is operative to accurately selectively position the driveshaft and the components in engagement therewith. For example in some arrangements the drive motor may comprise a servo motor, stepper motor or other suitable device for selectively rotating and angularly positioning a shaft or other components.

It should be understood that although in the exemplary arrangement the drive motor is symmetrical with regard to the axis of rotation 0 of the driveshaft, in other arrangements the motor body may be offset from the axis of rotation. This may be accomplished via use of a gearbox, gears, belts or other members for transmitting rotational power. In the exemplary arrangement the exemplary drive motor 5 has a housing that includes mounting ears, holes, studs or other suitable devices to facilitate fastening and holding the drive motor in position as part of an assembly. Of course it should be understood that these approaches are exemplary and in other arrangements other approaches may be used.

The exemplary actuator 6 includes a first rotor 4. The exemplary first rotor is in fixed operative connection with the motor via the driveshaft, and is selectively rotatable and angularly positionable by the motor. In the exemplary arrangement the first rotor generally has a disc-shape. However in other arrangements the rotor may have other shapes such as a multi-armed spider, for example.

The exemplary actuator further includes a second rotor 2. In the exemplary arrangement the second rotor is axially spaced away from the first rotor 4. The second rotor is mounted in operative connection with the actuator so as to be rotatable about the axis 0. In the exemplary arrangement the second rotor is configured to be rotatable only in a first rotational direction represented by Arrow A, and is prevented from being rotatable in a second rotational direction that is opposed of the first rotational direction. In the exemplary arrangement this is accomplished by the second rotor being in operative supported connection with a unidirectional bearing 1. In the exemplary arrangement the unidirectional bearing enables the second rotor 2 to rotate in the first rotational direction but prevents rotation of the second rotor in the second rotational direction. Of course it should be understood that this approach is exemplary and in other arrangements other structures for enabling rotation of the second rotor in only one rotational direction may be utilized such as a one-way clutch, a ratchet or other suitable structures.

The exemplary second rotor 2 is generally disc-shaped. However in other exemplary arrangements the second rotor may have other suitable shapes.

In the exemplary arrangement a plurality of actuating fingers 3 are movably mounted axially intermediate and in operative engagement with the first rotor and the second rotor. The actuating fingers each have a longitudinal inner end 3c and a longitudinal outer end 3d. The inner end of each exemplary actuating finger includes an aperture 3b which is alternatively referred to herein as a fixing hole. Each exemplary actuating finger further includes a longitudinally elongated recess 3a that is disposed longitudinally outwardly from the aperture 3b of the respective actuating finger.

In the exemplary arrangement shown there are four actuating fingers each having a generally longitudinally elongated rectangular shape and rounded inner and outer ends. In the exemplary arrangement the rounded outer ends of each of the actuating fingers is configured to operatively engage and movably position a portion of a valve such as a valve stem for example, that is in operative connection with a valve element that enables fluid flow through the valve. Of course it should be understood that this configuration of the actuating fingers is exemplary and in other arrangements other configurations for actuating members and approaches for moving valve elements may be used.

Figures 3, 4:
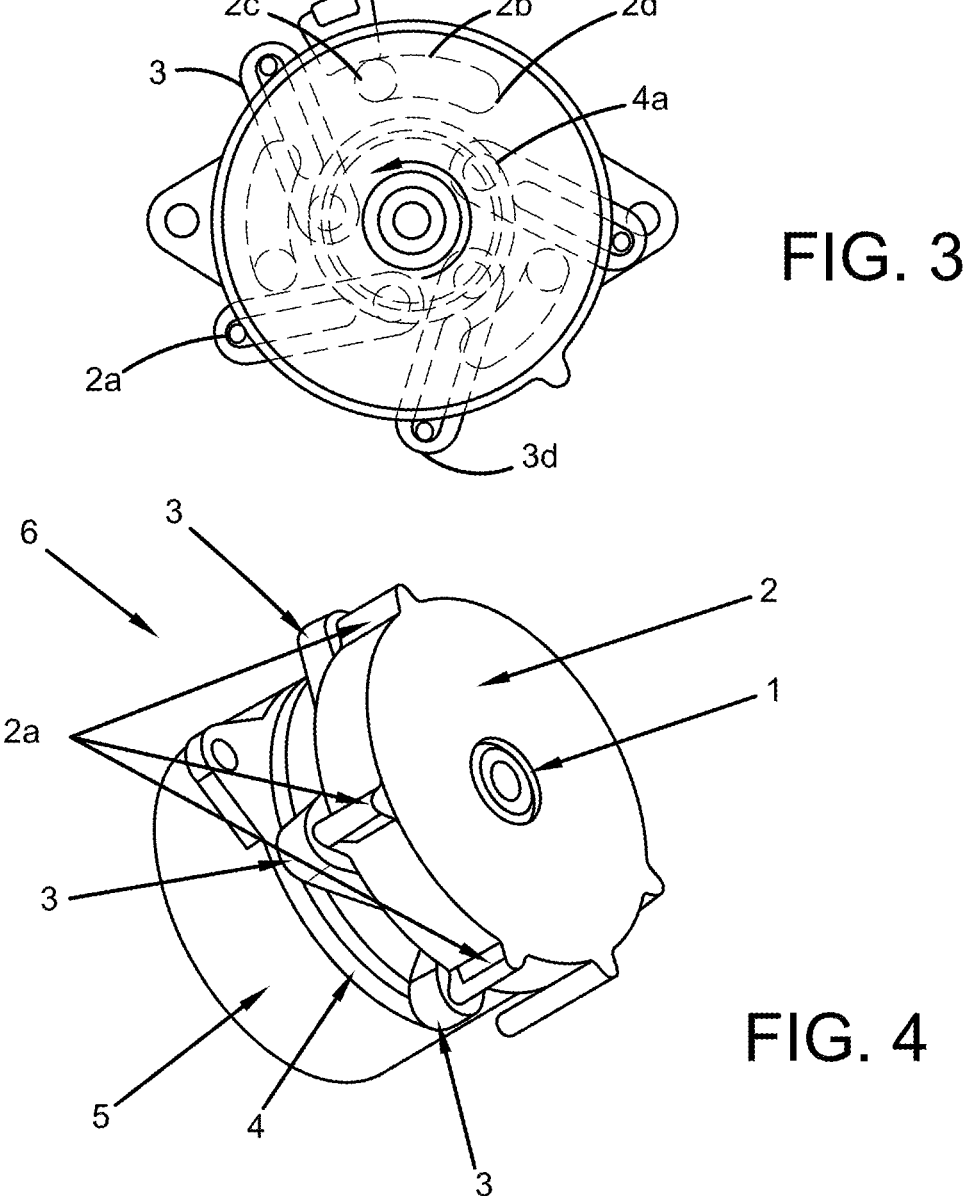
FIG. 3 is an axially transverse cross-sectional view of the exemplary valve actuator shown with each of the actuating fingers in a radially retracted position.
FIG. 4 is a perspective view of the exterior of the exemplary actuator with the actuating fingers in the retracted positions.

The exemplary first rotor includes at least one drive pin 4a which may be alternatively be referred to herein as an arbor fixing element. In the exemplary arrangement there are a plurality of drive pins that are angularly spaced about the axis 0 and are disposed radially outward from the axis on the first rotor. The drive pins extend axially intermediate of the first rotor in the second rotor. As shown in FIG. 3 in the exemplary arrangement there are four drive pins which corresponds to the number of actuating fingers. Each of the four drive pins are radially spaced away from the axis a uniform distance in this exemplary arrangement. However the drive pins are not equally angularly spaced or symmetrically arranged. This arrangement of the drive pins is provided in the exemplary arrangement to facilitate the ability to selectively actuate fluid valves individually, in groups and in selected sequences in a manner like that later discussed.

In the exemplary arrangement each of the drive pins 4a are configured to engage an aperture 3b that is adjacent a respective inner end of actuating finger. In the exemplary arrangement the interengagement of the drive pin and aperture enable the actuating finger to be movably mounted in operative connection with the first rotor. The engagement of each respective actuating finger with the first rotor is operative in a manner like that later discussed to enable the outer end of each actuating finger to move radially inward and outward responsive to relative rotational movement of the first rotor and the second rotor. However it should be understood that this mounting arrangement to achieve such radial movement is exemplary and in other arrangements other structures may be utilized to achieve such relative movement. Such arrangements may include for example, cams and cam followers, crank arms and pushrods, and other suitable structures to achieve controlled radial movement of an actuating finger responsive to relative rotational movement of the first and second rotors.

The exemplary first rotor further includes at least one drive rod 4b which may be alternatively referred to herein as a rod driver. In the exemplary arrangement three uniformly angularly spaced drive rods are in fixed operative connection with the first rotor. The drive rods extend parallel to the axis and axially intermediate of the first and second rotors. Each drive rod extends axially a sufficient distance to engage the second rotor.

Figures 5, 6:
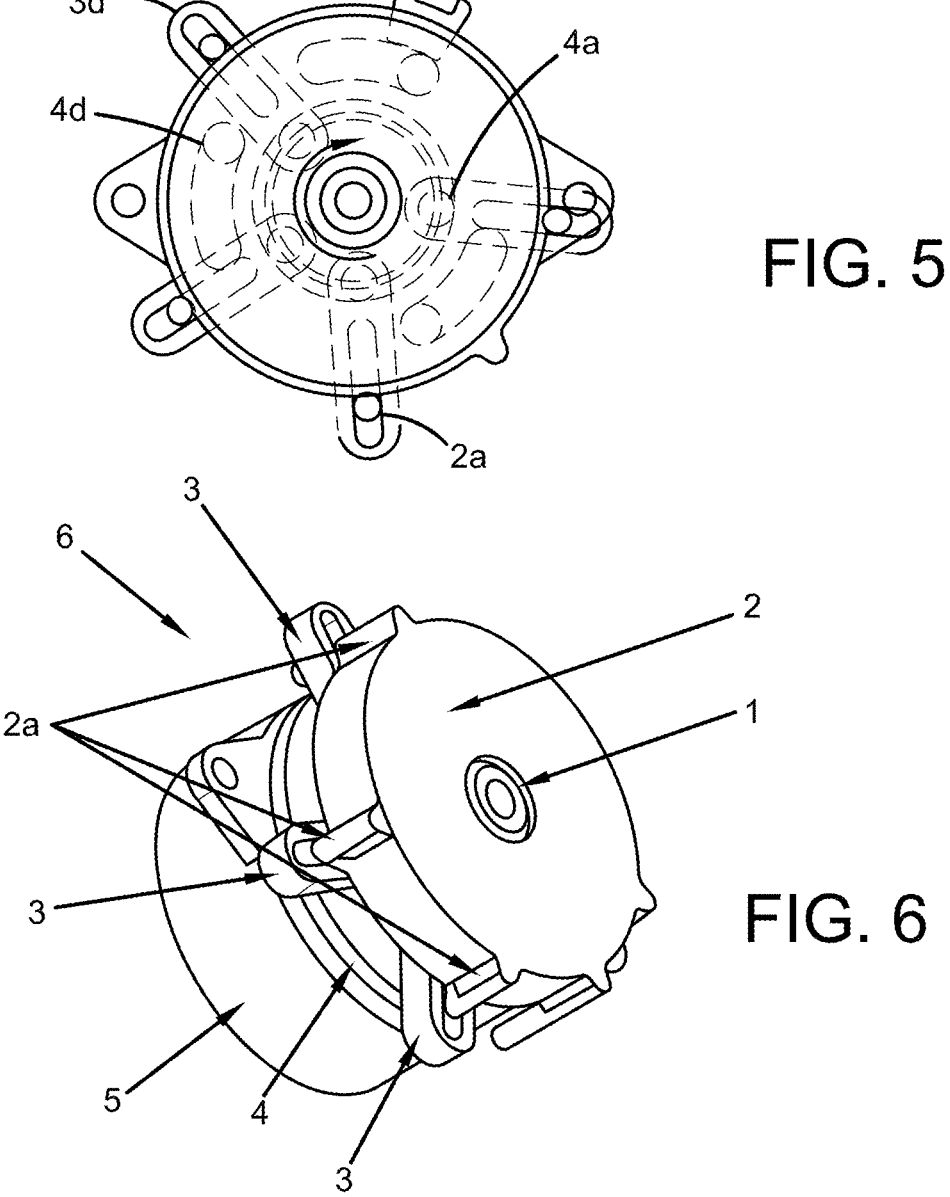
FIG. 5 is an axially transverse cross-sectional view of the exemplary valve actuator shown with each of the actuating fingers in a radially extended position.
FIG. 6 is a perspective view of the exterior of the exemplary actuator with the actuating fingers in the extended positions.

As shown in FIGS. 3 and 5 the exemplary second rotor includes three elongated arcuate slots 2b which may be alternatively referred to herein as angular recesses. The arcuate slots extend in centered relation about the axis 0. Each arcuate slot is bounded a respective angular first end by a first end wall 2c and at an opposed angular second end by a second end wall 2d. It should be understood that while in the exemplary arrangement the arcuate slots comprise closed slots that extend in the body of the second rotor, in other exemplary arrangements the arcuate slots may comprise open arcuate areas bounded by radially outward or axially extending end walls. These may include for example end walls that extend radially outward on the second rotor and/or end walls that extend in a direction parallel to the axis, for example. It should be understood that the configuration used in the arrangement shown is exemplary and in other arrangements other approaches may be used.

The exemplary arrangement further includes a plurality of guides 2a which are alternatively referred to herein as arbor fixing elements. In the exemplary arrangement each of the guides is positioned in an operatively fixed location on the second rotor. Each guide in the exemplary arrangement is positioned radially outward from the drive pins on the first rotor.

Each guide is configured to be in direction directing slidable engagement with a respective actuating finger. In the exemplary arrangement each respective guide 2a extends in a longitudinally elongated recess 3a of a respective actuating finger. This arrangement enables the outer end of the finger to be selectively moved radially inward and outward relative to the axis of the first and second rotors while the respective finger is held in movable sliding engagement with the respective guide at the respective guide location. It should be understood however that this guide arrangement for guiding the actuating fingers is exemplary and in other arrangements other types of guides such as slots, apertures, projections, rollers, gates or other guiding structures may be utilized, for example.

The exemplary arrangement of the first and second rotors, drive pins, actuating fingers and guides are configured to enable the outer ends of the actuating fingers to be moved radially inward and outward responsive to the relative rotational positions of the first and second rotors. For example when the first and second rotors have the relative rotational positions shown in FIG. 3, the drive pins 4a are positioned so that the outer ends of each of the actuating fingers is in a retracted position with the outer ends positioned in relatively close adjacent relation with the guides and the outer peripheries of the first and second rotors.

When the relative rotational positions of the first and second rotors are changed to be in the relative rotational positions shown in FIG. 5, the outer ends 3d of each of the actuating fingers 3 are radially moved outward from the retracted positions. This is because in the exemplary arrangement the respective drive pin of an actuating finger on the first rotor is moved closer to the location of the respective guide of the actuating finger. This radially outward movement is utilized in exemplary arrangements to change the positions of respective valve elements or similar structures with which the outer ends of the actuating fingers are radially operatively aligned and engaged to cause fluid flow through selected valves.

The exemplary coupling arrangement of the rotors in the exemplary actuator which includes the drive rods 4*b* and arcuate slots 2*b*, enables relative rotational movement of the first rotor relative to the second rotor through a first angular displacement in the first rotational direction, and through a second angular displacement in the second rotational direction. Because in the exemplary arrangement the first and second rotors can rotate in coordinated relation in the first rotational direction after the first and second rotors are in a first relative angular position in which the outer ends of the actuating fingers are in the retracted positions, the outer ends of the respective actuating fingers may be selectively positioned in an angular position in which the respective finger outer ends are in radial alignment with one or more valve stems or other actuating members of valves which are desired to be currently operated.

In the exemplary arrangement the first relative positions of the first and second rotors is shown in FIG. 3. To position the first and second rotors in the first relative rotational position the first rotor 4 may be rotated in the first rotational direction as represented by the arrow in FIG. 3, until each of the drive rods 4*b* is moved relative to the second rotor in its respective slot 2*b* and is in engagement with a respective first end wall 2*b*. With the first and second rotors in the first relative positions, in which the outer ends of each of the actuating fingers is retracted, rotation of the first rotor in the first rotational direction by the motor enables the first and second rotors to be rotated in the first rotational direction in coordinated relation. Rotation in the first rotational direction may be carried out until the rotors are in a selected rotational position in which the outer ends of the actuating fingers are immediately adjacent to and radially aligned with the valve stems of one or more valves through which fluid flow is to be initiated.

Once the outer ends of the actuating fingers are aligned with the desired valves to be actuated, movement by the motor of the first rotor in the second rotational direction causes relative movement of the first rotor relative to the second rotor through a second rotational displacement. The second rotor is held rotationally stationary by the unidirectional bearing or other structure as the first rotor rotates in the second direction. As shown in FIG. 5 as the first rotor rotates relative to the second rotor in the second rotational direction through a second rotational displacement from the relative rotational positions shown in FIGS. 3, the outer ends of the actuating fingers move radially outward from the retracted positions to the extended positions. The movement of the outer ends of the actuating fingers is operative to cause movement of respective valve elements of valves with which the fingers are currently operatively aligned, resulting in flow through the respective valves.

As can be appreciated once the selected valves have been opened in the current position of the actuating fingers and the operations have been accomplished by the pneumatic or hydraulic devices to which the working fluid has been delivered through the valves, the motor of the actuator may be operated responsive to suitable circuitry to rotate in the first rotational direction. Rotation in the first rotational direction causes the first rotor to rotate relative the second rotor through the first angular displacement and return the actuating fingers to the retracted positions shown in FIG. 3. This results in discontinuing flow through the valves with which the actuating fingers are currently radially aligned. The circuitry may then operate to cause the motor to rotate the first rotor in the second rotational direction again when the valves with which the outer ends of the actuating fingers are currently radially aligned are to again be opened. Alternatively if one or more other valves are to be operated, the circuitry is operative to cause the motor to rotate the first rotor in the first rotational direction to cause the outer ends of the actuating fingers to be retracted and then rotated to be radially aligned with one or more other valves. The valves with which the actuating fingers are moved to be currently radially aligned may then be actuated by the motor causing the first rotor to rotate relative to the second rotor in the second rotational direction through the second angular displacement which extends the outer ends of the fingers and actuates the currently selected one or more valves.

Figure 8:
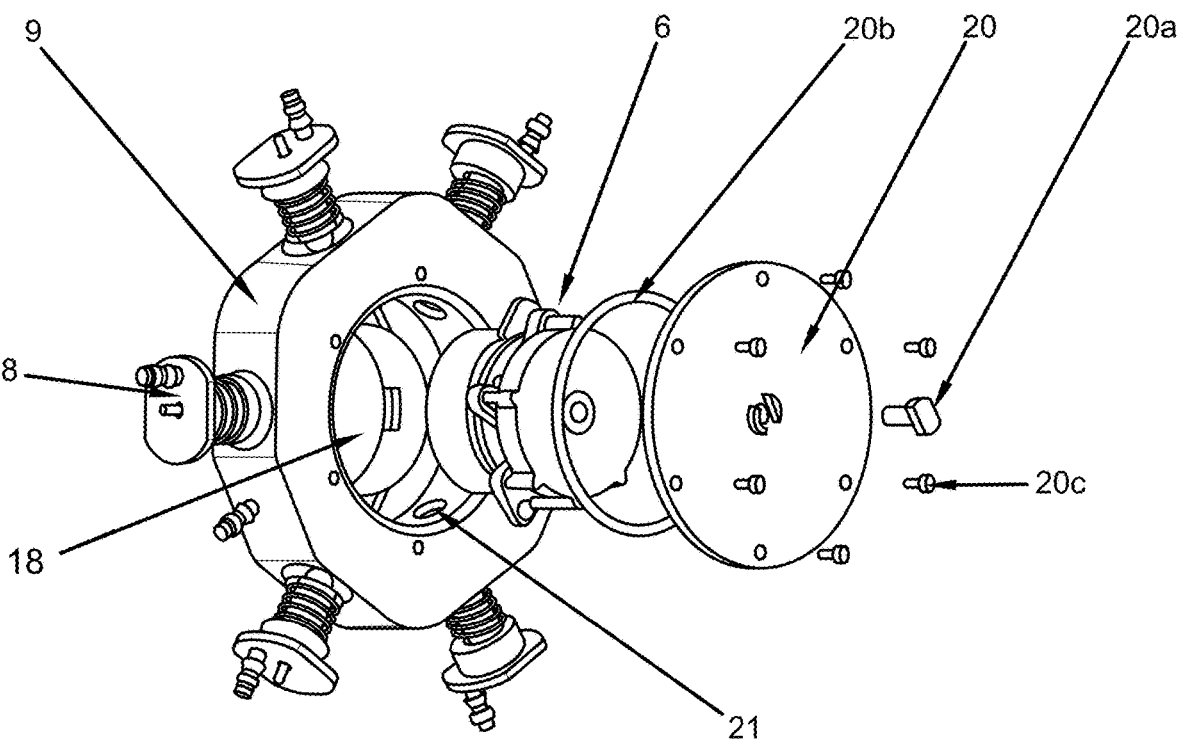
FIG. 8 is an exploded perspective view of the exemplary actuator of FIGS. 1-6 positioned in a central chamber of a valve block housing that includes a plurality of angularly spaced fluid valves.
Figures 9, 10, 11:
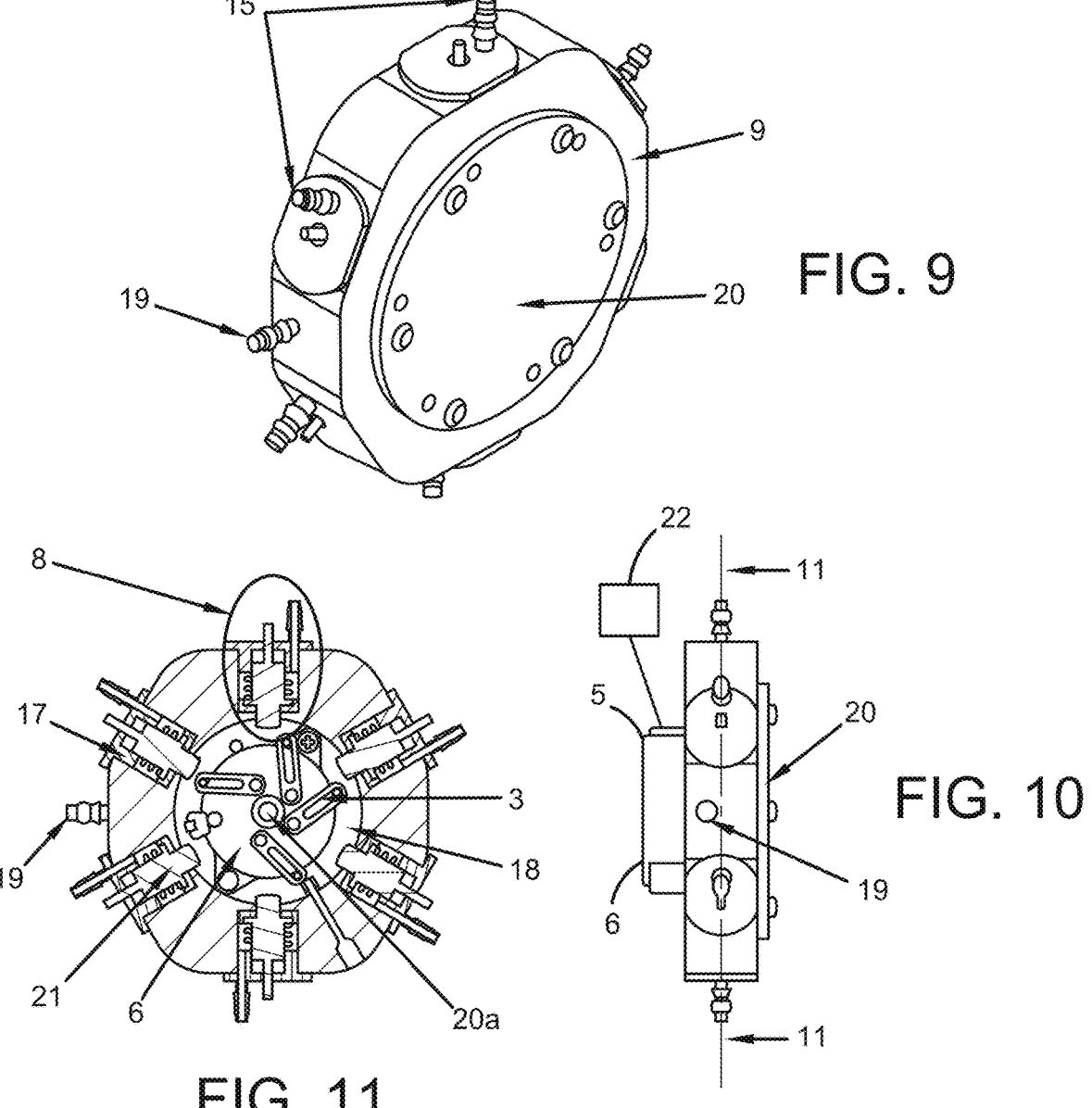
FIG. 9 is an external perspective view of the assembled valve block housing and actuator of FIG. 8.
FIG. 10 is a side view of the assembled valve block housing and actuator.
FIG. 11 is an axially transverse cross-sectional view of the valve block housing and actuator taken along line 11-11 in FIG. 10.

The exemplary valve actuator 6 may be used in conjunction with a plurality of fluid valves 8 which are removably positioned in a manifold referred to as a valve block housing 9 such as is shown in FIGS. 8-10. In this exemplary arrangement the valve block housing 9 includes a central opening 18 which is alternatively referred to herein as a chamber. The exemplary central opening is configured such that the actuator 6 is positioned in axially centered relation therein.

The exemplary valve block housing 9 includes a plurality of valve chambers 17 that extend radially therein. Each valve chamber is configured to have a fluid valve 8 removably positioned therein. In the exemplary arrangement each of the valve chambers are angularly spaced relative to the axis 0 of the actuator.

In the exemplary arrangement the chamber 18 in which the actuator is positioned is fluidly sealed. This is accomplished in an exemplary arrangement by respective seals which annularly seal an opening on a first axial side of the valve block through which the motor 5 of the actuator extends in an operative position as shown in FIG. 10. A cover 20 and associated cover seal 20*b* is operative to fluidly seal an opening on the axial side of the valve block housing that is on the opposite side from the opening through which the motor extends. In the exemplary arrangement a plurality of releasable fasteners 20*c* are operative to hold the cover 20 in sealed engagement with the valve block housing.

In the exemplary arrangement a shaft 20*a* extends in operatively supported connection on the cover 20. The exemplary shaft extends in axially centered relation in the chamber 18. In the exemplary arrangement the shaft is in operatively supported connection with the actuator 6 and is coaxial with the driveshaft 5*a* of the motor 5. In the exemplary arrangement the shaft 20*a* is maintained and held rotationally stationary through engagement with the cover 20, and is engaged with the second rotor 2 through the unidirectional bearing 1. Thus in the exemplary arrangement the shaft 20*a* serves to support the actuator at the axial end opposed of the motor as well as to be engaged with the unidirectional bearing which enables rotation of the second rotor in the first rotational direction while preventing rotation of the second rotor in the second rotational direction.

Of course it should be understood that this configuration is exemplary and in other arrangements other approaches may be used. For example in some exemplary arrangements the actuator may include a common axial support tube or other structure that axially extends between the first and second rotors of the actuator and which operates to maintain the rotors in the desired axial positions while providing for the relative rotational movement of the first and second rotors. In some exemplary arrangements such an axial support may also include features which provide structures which comprise the coupling between the first and second rotors and/or structures which provide for controlled rotational movement of the second rotor. Of course it should be understood that numerous different structures and arrangements may be utilized in actuators and valve arrangements which operate in accordance with the principles of the exemplary arrangements.

The fluid valves 8 which are used in the exemplary arrangement are shown in greater detail in FIGS. 11 through 16. Each exemplary valve is configured to be releasably positioned in a respective valve chamber 17. Each valve chamber has a connecting hole 21 that serves as a valve inlet and that extends to the central chamber 18. Radially outward of the connecting hole 21 of the respective valve chamber is positioned on annular radially extending valve seat 21a. The radially extending valve seat is configured to engage a valve element of a respective valve when the valve is in a closed position as hereinafter discussed.

Each exemplary fluid valve 8 includes a valve stem 10. In the operative position of the valve the valve stem is configured to be radially movable relative to a valve body 14 responsive to engagement of the radially inner end of the valve stem with the outer end of an actuating finger. Each valve body 14 includes an outer cover. The cover includes a vent opening 16 through which a radially outer end of the valve stem 10 extends. The cover also includes a valve outlet 15 therein which is accessible externally of the valve housing. The exemplary outlet 15 includes a fitting that is suitable for engaging a hose, tube, pipe or other suitable working fluid conduit. Of course it should be understood that this valve configuration is exemplary and in other arrangements other approaches may be used.

The exemplary valve further includes a valve element which in the exemplary arrangement comprises a sealing element 12. Valve element 12 is configured to engage the valve seat 21a and prevent fluid flow through the outlet or the connecting hole 21. A surface of the valve element in facing relation with the valve seat may be comprised of suitable resilient or other type material so as to prevent such fluid flow when the seat and element are in engaged relation. Of course this approach is exemplary and in other arrangements other approaches may be used.

The exemplary valve 8 includes a spring 11. The exemplary spring comprises a compression spring that is operative to bias the valve element 11 into engagement with the valve seat. As can be appreciated in the exemplary arrangement the spring is operative to automatically maintain the respective valve in a closed condition when the valve stem is not moved to displace the sealing element 11 away from the valve seat through engagement with an actuating finger. Of course it should be understood that this valve seat and biasing arrangement is exemplary and in other arrangements other approaches may be utilized.

The radially outer end of the valve stem 10 extends radially through the valve body 14 and an opening in the cover. The radially outer end of the valve stem extends radially inwardly from the inner surface of the vent opening 16 through the cover. The vent opening 16 serves as a vent hole for the valve which provides pressure relief within the valve chamber so as to facilitate the closing of the valve through operation of the spring 11.

Positioned in surrounding relation of the upper portion of the valve stem 10 radially inward of the vent opening 16, a vent seal 13 is positioned. In the exemplary arrangement in the closed position of the valve, the vent seal 13 is configured to be disposed inwardly away from the vent opening 16. As a result in the closed position of the valve the area of the valve chamber outwardly of the valve seat is open to atmosphere. When the valve stem is displaced radially outward relative to the axis 0, the valve element 11 is moved away from the seat so as to cause the valve to be in the open condition. As the valve stem 10 is moved radially outward the vent seal 13 is displaced outward so as to close the vent opening 16. This avoids any loss of fluid or pressure through the vent opening when the valve is in an open condition. This assures that all the fluid is delivered and all the fluid pressure available at the connecting hole 21 is delivered through the outlet 15 of the valve. Of course it should be understood that this approach is exemplary and in other arrangements other valve structures and operations may be utilized.

The exemplary valve block housing 9 includes at least one fluid inlet 19 to the common chamber 18. The fluid inlet 19 provides the pressurized working fluid that is to be selectively delivered through the valves 8 to the devices that are operated responsive to delivery of the working fluid. In the exemplary arrangement the actuator 6 has the drive motor 5 thereof in operative connection with control circuitry schematically indicated 22. In the exemplary arrangement the control circuitry 22 includes at least one processor and at least one data store which includes circuit executable instructions and data for controlling the actuator and the valves associated therewith. In the exemplary arrangement the circuitry is operative to receive inputs from sensors or other circuitry which may be indicative of a particular point in a machine or system cycle in which the working fluid is to be delivered to devices through one or more of the valves which are controlled by the actuator. The circuitry may then operate responsive to such inputs to cause the working fluid to be delivered through the outlets of one or more valves as are appropriate for operation at the particular point in the machine cycle.

As represented in FIGS. 11 and 12 the exemplary actuator may be operated to rotate the actuating fingers 3 to rotational positions in which respective outer ends of the actuating fingers are aligned with one or more valves 8 positioned in the valve block housing 9. This is accomplished through operation of the circuitry which includes one or more sensors such as an optical encoder, Hall Effect sensor, position sensor or other suitable device that is operative to sense the rotational position of at least one component of the actuator or valve arrangement that is indicative of the outer ends of the actuating fingers. In the exemplary arrangement once on outer end of an actuating finger has been aligned with a valve stem of the desired valve that is to be opened through rotation of the first and second rotors in the first rotational direction, the circuitry causes the drive motor to stop and then rotate in the second rotational direction. This causes the outer end of the aligned actuating finger to move from the retracted position toward the extended position. As shown in FIG. 12 this moves the valve stem of the valve radially outward against the force of the valve spring and moves the valve element 12 away from the valve seat. This causes the valve to be in the open condition in which working fluid is delivered from the valve outlet 15. This open condition of the valve continues until the circuitry causes the drive motor to rotate the first rotor in the first rotational direction. This causes the first and second rotors to move to the second relative positions retracting the actuating fingers and causing the valve to close.

As can be appreciated from the configuration of the four actuating fingers of the exemplary arrangement and the six valves which are positioned on the exemplary valve block housing, the exemplary actuator enables opening the valves in numerous different groups and sequences. For example in the exemplary arrangement the actuator may operate to open one or two valves consecutively or alternatively two valves simultaneously. Further it should be appreciated that in the exemplary arrangement actuating fingers may be positioned in locations that do not provide direct radial alignment with a particular valve stem while direct radial alignment is provided between another actuating finger and another valve stem. This approach may be used to open the valves to different degrees even though the actuating fingers may move radially outward the same distance. This is exemplary of various flow control approaches that may be used in some arrangements.

In exemplary arrangements the valve block housing includes outward extending recesses 7 in the housing that are angularly intermediate of the connecting holes 21 in which the valve stems are positioned. In the exemplary arrangement the recesses 7 enable the outer ends of the actuating fingers to move to the extended positions in the recesses when the outer ends are not in alignment with a respective valve stem. This enables the actuating fingers to be angularly positioned and radially movable in numerous different angular positions as may be desirable to actuate the valves in different orders and sequences. This may be desirable for different types of machines and system operations. Of course it should be understood that this arrangement is exemplary and in other arrangements other approaches may be used.

Figure 7:
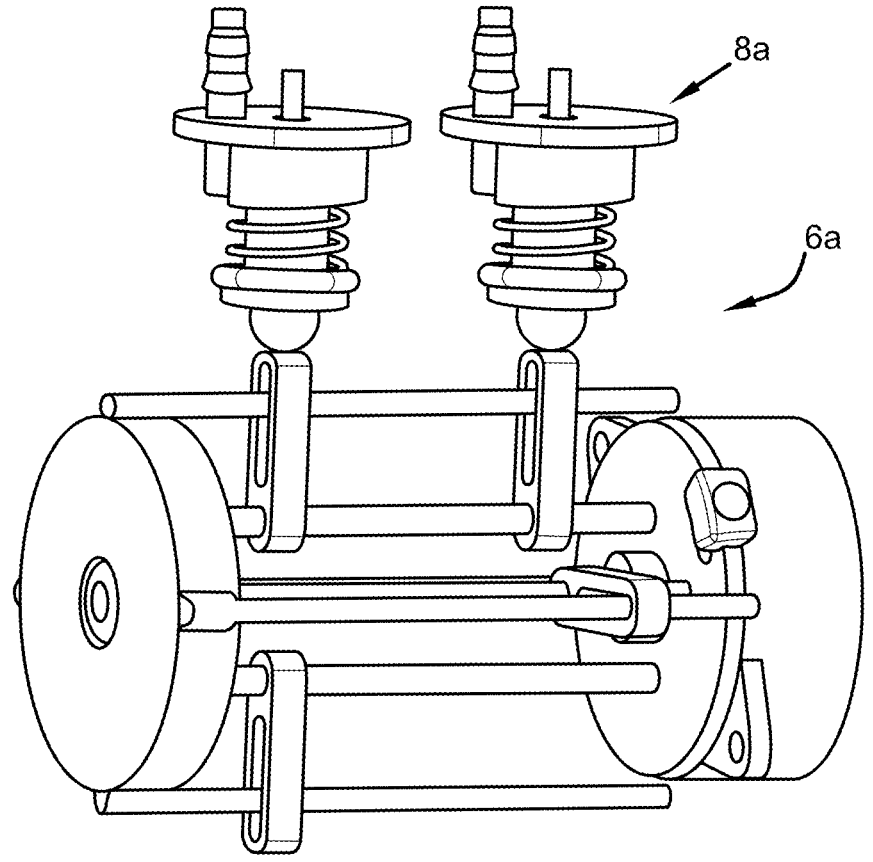
FIG. 7 is a perspective view of an alternative exemplary valve actuator configured to selectively actuate a plurality of fluid valves that are spaced apart along a direction parallel to the axis of rotation of the rotors of the actuator.

As can be appreciated the exemplary actuator arrangement enables valves arranged in various configurations to be selectively actuated. For example FIG. 7 shows an alternative valve actuator 6a which is configured for actuating valves that are disposed from one another in a direction that extends parallel to the axis of rotation of the first and second rotors. As shown in FIG. 7 the actuator 6a includes drive pins, guides and drive rods that are axially elongated relative to the corresponding components in actuator 6. The exemplary alternative arrangement enables a plurality of axially spaced actuating fingers to be positioned on each of the drive pins and guides. As a result a plurality of axially spaced valves 8a are enabled to be simultaneously opened and closed responsive to the actuator. Of course it should be appreciated that numerous other valve arrangements may be controlled by actuators which employ the principles of the exemplary arrangements described herein.

Further as can be appreciated from FIG. 7 actuators having the exemplary configuration may be utilized with alternative arrangements of valves which are positioned in valve block housings in which a plurality of valves are both angularly spaced as well as positioned in alignment parallel to the axis. In such alternative arrangements more fluid valves may be controlled through operation of a single actuator.

Thus as can be appreciated in exemplary arrangements an actuator with a single drive motor may be utilized to control fluid flow through a plurality of different valves. The valves may also be controlled so as to be operated individually or simultaneously. The valves may also be controlled to operate in different sequences or patterns so as to achieve the necessary delivery of working fluid to the hydraulic or pneumatic devices of the machine or system in which the actuator is used. Alternatively in other exemplary arrangements an actuator including features of exemplary arrangements may be used to selectively deliver other types of fluids such as coolants, lubricants or other materials.

Thus the exemplary arrangements achieve improved operation, eliminate difficulties encountered in the use of prior devices and systems, and attain the useful results described herein.

In the foregoing description certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful features and relationships are not limited to the exact features and relationships that have been shown and described.

It should be further understood that the features and/or relationships associated with one exemplary arrangement may be combined with features and/or relationships from another exemplary arrangement. That is, various features and/or relationships from various arrangements can be combined in further arrangements. The new and useful scope of the disclosure is not limited only to the exact arrangements that have been shown or described herein.

Having described features, discoveries and principles of the exemplary arrangements, the manner in which they are constructed and operated, and the advantages and useful results that are attained, the new and useful features, devices, elements, arrangements, parts, combinations, systems, equipment, operations, methods, processes and relationships are set forth in the appended claims.

We claim:

1. Apparatus comprising:

an actuator, wherein the actuator is configured to selectively control fluid flow through at least one valve, the actuator including:

a first rotor, wherein the first rotor is selectively rotatable about an axis, a second rotor, wherein the second rotor is axially disposed away from the first rotor, is rotatable about the axis in a first rotational direction and is prevented from rotating about the axis in a second rotational direction opposed of the first rotational direction, at least one actuating finger, wherein each actuating finger includes a longitudinal inner end and a longitudinal outer end, wherein the outer end is configured to operatively engage and position a respective valve element of a respective fluid valve, wherein flow through the respective fluid valve is controlled by the position of the respective valve element, at least one drive pin, wherein each drive pin is in operative connection with the first rotor, is disposed radially outward from the axis, and extends axially intermediate of the first rotor and the second rotor, wherein the respective inner end of each respective actuating finger is rotatably movably mounted in operative connection with the first rotor through a respective drive pin, at least one drive rod, wherein each drive rod is in fixed operative connection with the first rotor, is disposed radially outward from the axis, extends axially intermediate of the first rotor and the second rotor, and is operatively engageable with the second rotor, wherein the second rotor includes at least one elongated arcuate slot, wherein each slot extends along a respective arc that is concentric with the axis, is bounded at a first angular end by a first end wall, is bounded at a second angular end by a second end wall, wherein a respective drive rod extends within the slot
and is movable relative to the second rotor within
the slot between the first end wall and the second
end wall,
at least one guide, wherein each guide
is engaged with a respective actuating finger in a
respective guide location,
wherein the respective guide location
is further radially outward from the respective
drive pin with which the respective actuating
finger is operatively engaged,
is positioned in fixed relation relative to the sec-
ond rotor, and
is operative to enable the respective outer end of the
respective actuating finger to move radially
responsive to movement of the respective drive
pin relative to the second rotor while the actuating
finger is held in movable engagement with the
guide at the guide location,
wherein rotation of the first rotor in the first rotational
direction is operative to cause
the second rotor to rotate in the first rotational
direction responsive to engagement of each
respective drive rod with the respective first end
wall of the respective slot in which the respective
drive rod extends, and
the respective outer end of each actuating finger to be
positioned in a radially retracted position,
and wherein after rotation of the first rotor in the first
rotational direction has caused each actuating finger
to be positioned in the retracted position, rotation of
the first rotor in the second rotational direction is
operative to cause
each drive post to move in the second rotational
direction in the respective slot away from the first
end wall while the second rotor remains station-
ary,
each respective outer end of each actuating finger to
move radially outward from the retracted position
responsive to movement of the respective drive
pin relative to the guide location,
whereby radially outward movement of at least one
respective outer end is operative to position a
respective valve element that is in operative
engagement therewith.
2. The apparatus according to claim 1,
and further comprising:
a drive motor, wherein the drive motor
is in connection with the first rotor,
is selectively operative to
rotate the first rotor in each of the first rotational
direction and the second rotational direction, and
rotationally position the first rotor, the second rotor
and each of the actuating fingers that are in
operative connection with the first and second
rotors.
3. The apparatus according to claim 1,
wherein each drive rod is positioned further radially
outward from the axis than each drive pin.
4. The apparatus according to claim 1,
wherein each guide comprises a respective guide rod,
wherein each guide rod extends parallel to the axis, and
wherein each actuating finger includes a respective lon-
gitudinal recess, wherein a respective guide rod extends
in a respective longitudinal recess.

5. The apparatus according to claim 1,
wherein each guide comprises a respective guide rod,
wherein each guide rod
extends parallel to the axis, and
is angularly disposed away from at least one other
guide rod,
wherein each actuating finger includes a respective lon-
gitudinal recess,
wherein a respective guide rod extends in the respective
longitudinal recess.
6. The apparatus according to claim 1,
and further comprising:
a unidirectional bearing,
wherein the second rotor is rotationally movably mounted
through the unidirectional bearing,
wherein the unidirectional bearing enables rotation of the
second rotor in the first rotational direction and pre-
vents rotation of the second rotor in the second rota-
tional direction.
7. The apparatus according to claim 1,
wherein the actuator comprises a plurality of drive pins,
guides and actuating fingers,
wherein each of the actuating fingers is angularly spaced
away from an immediately adjacent actuating finger,
whereby the actuator is enabled to simultaneously control
fluid flow through a plurality of angularly spaced
valves.
8. The apparatus according to claim 1,
wherein the actuator comprises a plurality of axially
spaced actuating fingers,
wherein each of the actuating fingers is in operative
rotatable connection with a common drive pin,
whereby the actuator is enabled to simultaneously control
fluid flow through a plurality of axially spaced valves.
9. The apparatus according to claim 1,
and further comprising:
a plurality of valves, wherein the valves are angularly
spaced from one another about the axis, and each of the
valves is positioned such that the respective valve
element of each respective valve is movable radially
relative to the axis,
wherein the actuator comprises a plurality of actuating
fingers, and
wherein the fingers are rotationally positionable relative
to the plurality of valves such that
in a first rotational position of the fingers a valve is
actuated by radially outward movement of the fin-
gers, and
in a second rotational position of the fingers at least one
further valve other than the valve is actuated by
radially outward movement of the fingers.
10. The apparatus according to claim 1,
and further comprising:
a valve,
wherein the valve includes
a valve body,
a valve stem,
wherein the valve stem is movable relative to the valve
body in a radial direction relative to the axis,
a valve element, wherein the valve stem is in operative
connection with the valve element,
wherein the respective outer end of each at least one
actuating finger is rotationally positionable in radial
alignment with the stem and is selectively operative to
radially move the valve element.

11. The apparatus according to claim 9,
and further comprising:
a housing, wherein each of the valves is in mounted
connection with the housing,
wherein the housing includes a central opening,
wherein the actuator is positioned in the central opening,
wherein the housing includes at least one valve chamber,
wherein each valve chamber extends radially relative to
the axis and is configured to house a respective valve
therein.

12. The apparatus according to claim 9,
and further comprising:
a housing, wherein the housing includes a central open-
ing,
wherein the actuator extends in the central opening, and
wherein the housing includes a plurality of axially cen-
tered angularly spaced valve chambers,
wherein each valve chamber extends radially relative to
the axis and houses a respective valve therein,
wherein the valve actuator is selectively operative to
either
selectively radially position a respective valve element
of only one of the valves at a time, and
selectively radially position the respective valve ele-
ments of at least two of the plurality of the valves
simultaneously.

13. The apparatus according to claim 9,
wherein the actuator further includes a drive motor,
wherein the drive motor includes a driveshaft that
extends coaxially with the axis and is in operative
connection with the first rotor,
and further comprising:
a housing, wherein the housing includes a central open-
ing,
wherein the actuator extends in the central opening, and
wherein the housing includes at least one valve chamber,
wherein each valve chamber extends radially relative to
the axis and houses a respective valve therein,
wherein the housing is configured such that the actuator is
enabled to selectively radially position a respective
valve element of each respective valve housed in a
respective valve chamber.

14. The apparatus according to claim 9,
and further comprising:
a housing, wherein the housing includes
a central chamber, and
a fluid inlet to the central chamber,
wherein the central chamber
has the actuator extending within the central cham-
ber, and
is sealed in fluid tight relation,
wherein the housing includes a plurality of radially
extending valve chambers, wherein the valve chambers
are angularly spaced about the axis,
wherein each valve chamber houses a respective valve
therein,
wherein each valve includes a respective valve inlet in
immediate fluid connection with the central chamber,
and a respective valve outlet that is accessible external
of the valve housing, wherein the respective valve
element is fluidly intermediate of the respective valve
inlet and the respective valve outlet of the respective
valve,
wherein the actuator is selectively operative to control
fluid flow between the respective valve inlet and valve
outlet of each of the valves.

15. The apparatus according to claim 9,
and further comprising:
a housing, wherein the housing includes
a central chamber, and
a fluid inlet to the central chamber,
wherein the central chamber
has the actuator extending within the central cham-
ber, and
is sealed in fluid tight relation,
wherein the housing includes a plurality of radially
extending valve chambers, wherein the valve chambers
are angularly spaced about the axis,
wherein each valve chamber houses a respective valve
therein,
wherein each valve includes a respective valve inlet in
immediate fluid connection with the central chamber,
and a respective valve outlet that is accessible external
of the valve block housing, wherein the respective
valve element is fluidly intermediate of the respective
valve inlet and the respective valve outlet of the respec-
tive valve,
wherein the actuator is selectively operative to cause fluid
flow between the respective valve inlet and valve outlet
of at least two of the valves concurrently while fluid
flow through at least one other valve is prevented.

16. The apparatus according to claim 9,
and further comprising:
a housing, wherein the housing includes
a central chamber, and
a fluid inlet to the central chamber,
wherein the central chamber
has the actuator extending within the central cham-
ber, and
is sealed in fluid tight relation by at least one cover,
wherein the at least one cover is in operatively
supporting connection with an axially extending
shaft,
wherein the shaft extends in the chamber and is in
operatively supporting connection with the
actuator,
wherein the housing includes a plurality of radially
extending valve chambers, wherein the valve chambers
are angularly spaced about the axis,
wherein each valve chamber houses a respective valve
therein,
wherein each valve includes a respective valve inlet in
immediate fluid connection with the central chamber,
and a respective valve outlet that is accessible external
of the housing, wherein the respective valve element is
fluidly intermediate of the respective valve inlet and the
respective valve outlet of the respective valve,
wherein the actuator is selectively operative to control
fluid flow between the respective valve inlet and valve
outlet of each of the valves.

17. The apparatus according to claim 9,
and further comprising:
a housing, wherein the housing includes
a central chamber, and
a fluid inlet to the central chamber,
wherein the central chamber
has the actuator extending within the central cham-
ber, and
is sealed in fluid tight relation by at least one cover,
wherein the at least one cover is in operative sup-
porting connection with an axially extending
shaft, wherein the shaft extends in the chamber and is in operatively supporting connection with the actuator, a unidirectional bearing, wherein the unidirectional bearing is mounted operatively intermediate of the shaft and the second rotor, wherein the unidirectional bearing enables rotation of the second rotor in the first rotational direction and prevents rotation of the second rotor in the second rotational direction, wherein the housing includes a plurality of radially extending valve chambers, wherein the valve chambers are angularly spaced about the axis, wherein each valve chamber houses a respective valve therein, wherein each valve includes a respective valve inlet in immediate fluid connection with the central chamber, and a respective valve outlet that is accessible external of the valve block housing, wherein the respective valve element is fluidly intermediate of the respective valve inlet and the respective valve outlet of the respective valve, wherein the actuator is selectively operative to control fluid flow between the respective valve inlet and valve outlet of each of the valves.

18. Apparatus comprising:

an actuator, wherein the actuator is configured to selectively control fluid flow through at least one valve, the actuator including:

a motor, a first rotor, wherein the first rotor is in operative connection with the motor, and is selectively rotatable about an axis responsive to operation of the motor in a first rotational direction and in a second rotational direction opposed of the first rotational direction, a second rotor, wherein the second rotor it is rotatable about the axis in the first rotational direction and is prevented from rotating about the axis in the second rotatable direction, a coupling, wherein the coupling operatively rotationally connects the first rotor and the second rotor, and enables the first rotor to rotate in the first rotational direction through a first angular displacement relative to the second rotor and thereafter responsive to further rotation of the first rotor in the first rotational direction, the second rotor rotates in the first rotational direction in coordinated relation with the first rotor, and after the first rotor has rotated relative to the second rotor in the first rotational direction through at least the first angular displacement, enables the first rotor to rotate relative to the second rotor in the second rotational direction through a second rotational displacement while the second rotor remains stationary, at least one actuating finger, wherein each actuating finger includes a longitudinal inner end and a longitudinal outer end, wherein the inner end of each actuating finger is in movable operative connection with the first rotor, wherein the outer end of each actuating finger is configured to operatively engage and position a respective valve element of a respective fluid valve, wherein a rate of fluid flow through the respective fluid valve is controlled responsive to the position of the respective valve element, at least one guide, wherein each guide is in operative connection with the second rotor, is in direction directing movable engagement with a respective actuating finger in a location that is disposed longitudinally away from the respective inner end of the actuating finger, wherein rotation of the first rotor in the first rotational direction responsive to the motor is operative to cause the first rotor to move through the first angular displacement relative to the second rotor, wherein relative movement through the first angular displacement is operative to cause each outer end of each respective actuating finger to move in guided relation with the respective guide to a respective radially retracted position, wherein after rotation of the first rotor in the first rotational direction has caused each actuating finger to be positioned in the retracted position, rotation of the first rotor responsive to the motor in the second rotational direction is operative to cause the outer end of each actuating finger to move radially outward from the retracted position responsive to movement of the first rotor in the second rotational direction relative to the second rotor while the second rotor remains stationary, whereby radially outward movement of at least one respective outer end of an actuating finger is operative to position a respective valve element in operative engagement therewith so as to enable controlled fluid flow through a respective valve that includes the valve element.

19. The apparatus according to claim 18, wherein the second rotor is axially disposed from the first rotor, wherein the respective inner end of each actuating finger is in operative relatively rotatable connection with the first rotor through a respective drive pin, wherein each respective drive pin is disposed radially outward from the axis, and extends axially intermediate of the first rotor and the second rotor.

20. The apparatus according to claim 19, wherein the coupling comprises:

at least one drive rod, wherein each drive rod is in fixed operative connection with one of the first rotor and the second rotor, is disposed radially outward from the axis, extends axially intermediate of the first rotor in the second rotor, is relatively rotationally movable within a respective elongated arcuate slot of the other of the first rotor and the second rotor, wherein each slot extends along a respective arc that is concentric with the axis, is bounded at a first angular end by a first end wall, is bounded at the second angular end opposed of the first angular end by a second end wall, wherein the first rotor is enabled to move in the first rotational direction through the first angular displacement relative the second rotor, and in the second rotational direction through the second angular displacement relative to the second rotor, responsive to rotational movement of each respective drive post in a respective slot intermediate of the respective first and second end walls.

21. The apparatus according to claim 20,
wherein each guide comprises a respective guide rod,
wherein each guide rod
  extends parallel to the axis,
  is in fixed operative connection with the second rotor at
    a respective location,
  wherein each respective location is disposed further
    radially outward from each drive pin,
wherein each actuating finger includes a respective lon-
  gitudinal recess,
wherein a respective guide rod extends in the respective
  longitudinal recess,
whereby the actuating finger is enabled to slidably move
  in engagement with the guide rod.

\* \* \* \* \*